(12) United States Patent
Ronen et al.

(10) Patent No.: US 11,789,264 B2
(45) Date of Patent: Oct. 17, 2023

(54) DISPLAY WITH STACKED LIGHT-GUIDE ELEMENTS PROVIDING DIFFERENT PARTS OF FIELD OF VIEW

(71) Applicant: Lumus Ltd., Ness Ziona (IL)

(72) Inventors: Eitan Ronen, Rechovot (IL); Ronen Chriki, Lod (IL); Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/018,082

(22) PCT Filed: Jul. 4, 2022

(86) PCT No.: PCT/IL2022/050714
§ 371 (c)(1),
(2) Date: Jan. 26, 2023

(87) PCT Pub. No.: WO2023/281499
PCT Pub. Date: Jan. 12, 2023

(65) Prior Publication Data
US 2023/0204952 A1    Jun. 29, 2023

Related U.S. Application Data

(60) Provisional application No. 63/218,329, filed on Jul. 4, 2021.

(51) Int. Cl.
*G02B 27/01* (2006.01)
*F21V 8/00* (2006.01)

(52) U.S. Cl.
CPC ....... *G02B 27/0101* (2013.01); *G02B 6/0031* (2013.01); *G02B 6/0076* (2013.01); *G02B 6/0035* (2013.01); *G02B 2027/0123* (2013.01)

(58) Field of Classification Search
CPC ... G02B 27/01–0189; G02B 2027/0105–0198; G02B 6/00–567
See application file for complete search history.

(56) References Cited

U.S. PATENT DOCUMENTS

| | | | |
|---|---|---|---|
| 2,329,001 A | 9/1943 | Van King | |
| 2,748,659 A | 6/1956 | Geffcken et al. | |

(Continued)

FOREIGN PATENT DOCUMENTS

| | | |
|---|---|---|
| CN | 101542346 | 9/2009 |
| CN | 107238928 | 10/2017 |

(Continued)

OTHER PUBLICATIONS

S. Chattopadhyay et al: "Anti-reflecting and photonic nanostructures", Materials Science and Engineering: R: Repots, vol. 69, No. 1-3, Jun. 20, 2010, pp. 1-35.

(Continued)

*Primary Examiner* — Bao-Luan Q Le
*Assistant Examiner* — Christopher A Lamb, II
(74) *Attorney, Agent, or Firm* — Mark M. Friedman

(57) ABSTRACT

A display for providing an image to an eye of a user has a compound light-guide arrangement formed from juxtaposed first and second slab waveguides (10, 20). Image illumination from a projector (100) is introduced, part into each waveguide, so as to propagate by internal reflection within the waveguide. A coupling-out configuration of the first waveguide (10) includes a first set of obliquely-angled internal partially-reflecting surfaces (11) in a first region of the compound light-guide arrangement for coupling-out a first part of the field of view, and a coupling-out configuration of the second waveguide (20) includes a second set of obliquely-angled internal partially-reflecting surfaces (21) in a second region of the compound light-guide arrangement, (Continued)

at least partially non-overlapping with the first region, for coupling-out a second part of the field of view.

15 Claims, 7 Drawing Sheets

(56) References Cited

U.S. PATENT DOCUMENTS

| | | |
|---|---|---|
| 2,795,069 A | 6/1957 | Hardesty |
| 2,886,911 A | 5/1959 | Hardesty |
| 3,491,245 A | 1/1970 | Hardesty |
| 3,544,190 A | 1/1970 | Moorhusen |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,770,847 A | 6/1998 | Olmstead |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 5,999,836 A | 12/1999 | Nelson |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,643,214 B2 | 1/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,949,214 B2 | 5/2011 | Dejong |
| 7,949,252 B1 | 5/2011 | Georgiev |
| 7,995,275 B2 | 8/2011 | Maeda et al. |
| 8,004,765 B2 | 8/2011 | Amitai |
| 8,035,872 B2 | 10/2011 | Ouchi |
| 8,187,481 B1 | 5/2012 | Hobbs |
| 8,369,019 B2 | 2/2013 | Baker |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,873,148 B1 | 10/2014 | Gupta et al. |
| 8,913,865 B1 | 12/2014 | Bennett |
| 8,965,152 B2 | 2/2015 | Simmonds |
| 8,976,452 B2 | 3/2015 | Takagi et al. |
| 9,248,616 B2 | 2/2016 | Amitai |
| 9,523,852 B1 | 12/2016 | Brown et al. |
| 9,805,633 B2 | 10/2017 | Zheng |
| 9,933,684 B2 | 4/2018 | Brown et al. |
| 10,048,499 B2 | 8/2018 | Amitai |
| 10,191,288 B2 | 1/2019 | Singer et al. |
| 10,261,321 B2 | 4/2019 | Amitai |
| 10,302,835 B2 | 5/2019 | Danziger |
| 10,520,733 B2 | 12/2019 | Takeda et al. |
| 10,739,598 B2 | 8/2020 | Ofir |
| 10,830,938 B2 | 11/2020 | Eisenfeld |
| 11,221,294 B2 | 1/2022 | Aldaag et al. |
| 11,442,273 B2 | 9/2022 | Danziger et al. |
| 2001/0030860 A1 | 10/2001 | Kimura et al. |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0197938 A1 | 10/2003 | Schmidt et al. |
| 2003/0218718 A1 | 11/2003 | Moliton et al. |
| 2004/0084088 A1 | 5/2004 | Callies |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2000/5024849 | 2/2005 | Parker et al. |
| 2005/0073577 A1 | 4/2005 | Sudo |

(56) References Cited

U.S. PATENT DOCUMENTS

| | | |
|---|---|---|
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai |
| 2005/0225866 A1 | 10/2005 | Ageel |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0146518 A1 | 7/2006 | Dubin |
| 2006/0153518 A1 | 7/2006 | AGeel et al. |
| 2006/0268421 A1 | 11/2006 | Shimizu et al. |
| 2007/0052929 A1 | 3/2007 | Allman et al. |
| 2007/0070859 A1 | 3/2007 | Hirayama |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0247150 A1 | 10/2008 | Itoh et al. |
| 2008/0278812 A1 | 11/2008 | Amitai |
| 2008/0316606 A1 | 12/2008 | Inoguchi et al. |
| 2009/0010023 A1 | 1/2009 | Kanada et al. |
| 2009/0052046 A1 | 2/2009 | Amitai |
| 2009/0122414 A1 | 5/2009 | Amitai |
| 2009/0190222 A1 | 7/2009 | Simmonds et al. |
| 2010/0067110 A1 | 3/2010 | Yaakov et al. |
| 2010/0111472 A1 | 5/2010 | DeJong |
| 2010/0202128 A1 | 8/2010 | Saccomanno |
| 2010/0278480 A1 | 11/2010 | Vasylyev |
| 2010/0290124 A1 | 11/2010 | Tohara et al. |
| 2010/0291489 A1 | 11/2010 | Moskovits et al. |
| 2011/0050595 A1 | 3/2011 | Lunback et al. |
| 2011/0096566 A1 | 4/2011 | Tsai et al. |
| 2011/0191690 A1 | 8/2011 | Hang et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0194781 A1 | 8/2012 | Agurok |
| 2012/0306940 A1 | 12/2012 | Machida |
| 2013/0022316 A1 | 1/2013 | Pelletier et al. |
| 2013/0083404 A1 | 4/2013 | Takagi et al. |
| 2013/0187836 A1 | 7/2013 | Cheng |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0016051 A1 | 1/2014 | Kroll |
| 2014/0043688 A1 | 2/2014 | Schrader et al. |
| 2014/0104665 A1 | 4/2014 | Popovitch |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182748 A1 | 7/2015 | Gefen et al. |
| 2015/0207990 A1 | 7/2015 | Ford |
| 2015/0219834 A1 | 8/2015 | Nichol et al. |
| 2015/0241619 A1 | 8/2015 | Richards et al. |
| 2015/0033865 A1 | 11/2015 | Sawada et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0238844 A1 | 8/2016 | Dobschal |
| 2016/0312913 A1 | 10/2016 | Thybo et al. |
| 2016/0341964 A1 | 11/2016 | Amitai |
| 2016/0370693 A1 | 12/2016 | Watanabe |
| 2017/0045743 A1 | 2/2017 | Dobschal et al. |
| 2017/0075119 A1 | 3/2017 | Schultz et al. |
| 2017/0097506 A1 | 4/2017 | Schowengerdt et al. |
| 2017/0192239 A1* | 7/2017 | Nakamura ........... G02B 6/0036 |
| 2017/0242249 A1 | 8/2017 | Wall |
| 2017/0336636 A1 | 11/2017 | Amitai et al. |
| 2017/0343822 A1 | 11/2017 | Border et al. |
| 2017/0363799 A1 | 12/2017 | Ofir |
| 2018/0003862 A1 | 1/2018 | Benitez et al. |
| 2018/0101087 A1 | 4/2018 | Shinohara |
| 2018/0292599 A1 | 10/2018 | Ofir et al. |
| 2018/0299678 A1* | 10/2018 | Singer ................. G02B 6/005 |
| 2018/0372940 A1 | 12/2018 | Ishii et al. |
| 2018/0373115 A1 | 12/2018 | Brown et al. |
| 2019/0212487 A1 | 7/2019 | Danziger et al. |
| 2019/0227215 A1 | 7/2019 | Danziger et al. |
| 2020/0120329 A1 | 4/2020 | Danziger |
| 2020/0278547 A1 | 9/2020 | Singer et al. |
| 2020/0292819 A1* | 9/2020 | Danziger ............ G02B 6/0028 |
| 2020/0349612 A1* | 11/2020 | Machida ................ G09G 3/38 |
| 2020/0355924 A1 | 11/2020 | Dobschal |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0080637 A1* | 3/2021 | Brick ................ G02B 27/0172 |
| 2021/0099691 A1 | 4/2021 | Danziger |

FOREIGN PATENT DOCUMENTS

| | | |
|---|---|---|
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 177959 | 5/2007 |
| EP | 2530510 | 12/2012 |
| FR | 1485692 A | 6/1967 |
| FR | 2496905 | 6/1982 |
| FR | 2617562 | 1/1989 |
| FR | 2638242 | 4/1990 |
| FR | 2721872 | 1/1996 |
| GB | 2220 081 | 12/1989 |
| GB | 2272980 | 6/1994 |
| GB | 2278222 | 11/1994 |
| GB | 2278883 | 12/1994 |
| JP | 2001021448 | 1/2001 |
| JP | 2002539498 | 11/2002 |
| JP | 2003140081 | 5/2003 |
| JP | 2003337298 A | 11/2003 |
| JP | 2003536102 | 12/2003 |
| JP | 2004527801 | 9/2004 |
| JP | 2005084522 | 3/2005 |
| JP | 2006003872 | 1/2006 |
| JP | 2007505353 A | 3/2007 |
| JP | 2010217906 A | 9/2010 |
| JP | 2012123936 A | 6/2012 |
| JP | 2014506340 A | 3/2014 |
| JP | 2016028275 A | 2/2016 |
| JP | 2016197830 A | 11/2016 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |

(56) References Cited

FOREIGN PATENT DOCUMENTS

| | | |
|---|---|---|
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 12088478 A1 | 6/2012 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

OTHER PUBLICATIONS

Petros I Stavroulakis et al: "Suppression of backscattered diffraction from sub-wavelenght "moth-eye" arrays References and Links / Optics Express 1", Endeavour Nanotechnology Zoolog. Sci. Philos. Trans. J. Mod. Opt. Appl. Opt. Opt. Acta (Lond.) Appl. Opt. Appl. Opt. Opt. Lett. Jpn. J. Appl. Pjys. J. Ceram. Soc. Jpn. Opt. Commun. App;. Opt. Opt. Lett. Nanotechno, Jan. 1, 1967, pp. 79-84.

Chin-Hao Chang et al: "Nanostrutured gradient-index antireflection diffractive optics", Optics Letters, vol. 36, No. 12, Jun. 15, 2011, p. 2354.

Qiaoyin Yang et al: "Antireflection effects at nanostructured material interfaces and the suppression of thin-film interference", Nanotechnology, vol. 24, No. 23, May 15, 2013, p. 235202.

Hemant Kumar Raut et al: "Anti-reflective coatings: A critical, in-depth review", Energy & Environmental Science, vol. 4, No. 10, Jan. 1, 2011, p. 3779.

R. J. Weiblen et al: "Optimized moth-eye anti-reflective structures for As_2S_3 chalcogentide optical fibers", Optics Express, vol. 24, No. 10, May 2, 2016 p. 10172.

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

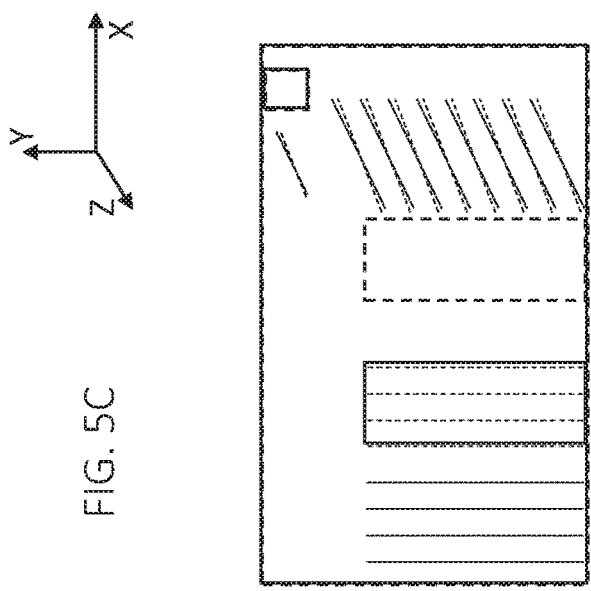
FIG. 5A
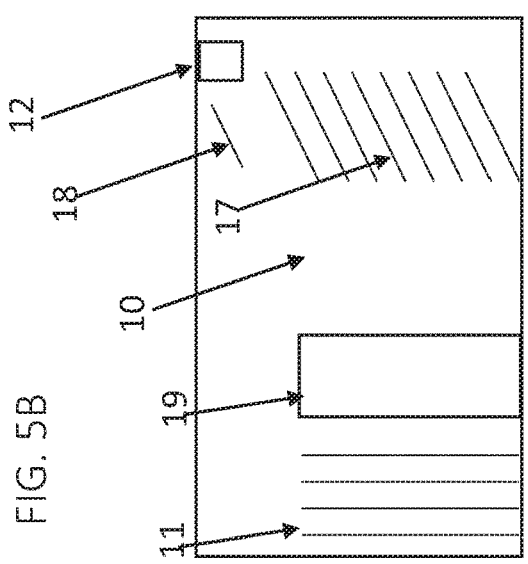
FIG. 5B
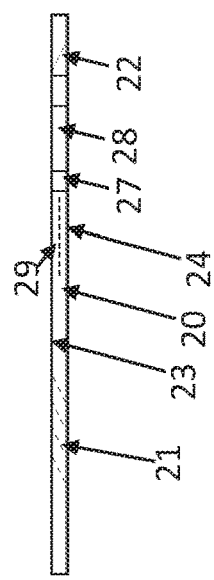
FIG. 5C
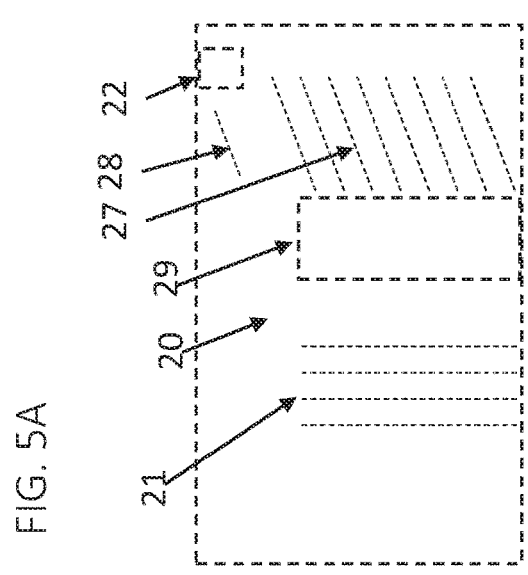
FIG. 6A
FIG. 6B
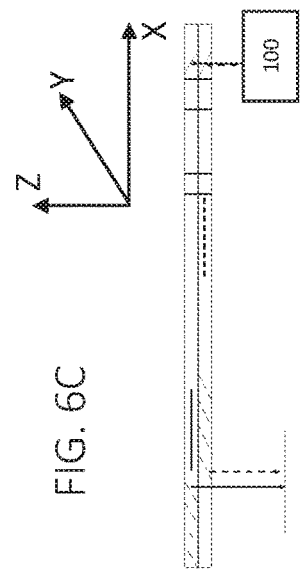
FIG. 6C

DISPLAY WITH STACKED LIGHT-GUIDE ELEMENTS PROVIDING DIFFERENT PARTS OF FIELD OF VIEW

FIELD AND BACKGROUND OF THE INVENTION

The present invention relates to displays and, in particular, it concerns a display with stacked light-guide optical elements that provide different parts of an image field of view. Certain head-up displays, particularly near-eye displays, employ a light-guide optical element (LOE) formed as a transparent block of material with parallel external major surfaces which guide light by internal reflection, and with a set of partially-reflecting internal surfaces, obliquely angled to the major surfaces. A collimated image is generated by an image projector and injected into the LOE (also referred to as a "waveguide" or "substrate") so as to propagate within the LOE by internal reflection until being progressively coupled-out by the partially-reflecting internal surfaces towards the eye of the user. Examples of waveguides of this sort may be found in PCT patent application publication no. WO03081320A1.

The angular dimensions of the field of view which can be displayed by such an arrangement are limited by geometrical optics considerations, such as the range of angles which can be trapped within the waveguide so as to propagate by internal reflection, and avoidance of overlap between an image and its conjugate within the waveguide.

SUMMARY OF THE INVENTION

The present invention is a display for providing an image to an eye of a user. According to the teachings of an embodiment of the present invention there is provided, a display for providing an image to an eye of a user, the display comprising: (a) a compound light-guide arrangement comprising: (i) a first light-guide optical element comprising a block of transparent material having a pair of mutually-parallel major surfaces for guiding light by internal reflection at the major surfaces, and (ii) a second light-guide optical element comprising a block of transparent material having a pair of mutually-parallel major surfaces for guiding light by internal reflection at the major surfaces, the first and second light-guide optical elements being stacked with the major surfaces juxtaposed; and (b) an image projector configured to project image illumination corresponding to a collimated image with an angular field of view, the image projector being optically coupled to the compound light-guide arrangement so as to introduce a first part of the image illumination to propagate by internal reflection within the first light-guide optical element and a second part of the image illumination to propagate by internal reflection within the second light-guide optical element, wherein the first light-guide optical element includes a first coupling-out configuration comprising a first plurality of mutually-parallel, partially-reflecting surfaces deployed between the major surfaces of the first light-guide optical element and angled obliquely to the major surfaces, the first plurality of partially-reflecting surfaces being located in a first region of the compound light-guide arrangement for coupling-out a first part of the field of view of the image illumination for viewing by the eye of the user, and wherein the second light-guide optical element includes a second coupling-out configuration comprising a second plurality of mutually-parallel, partially-reflecting surfaces deployed between the major surfaces of the second light-guide optical element and angled obliquely to the major surfaces, the second plurality of partially-reflecting surfaces being non-parallel to the first plurality of partially-reflecting surfaces and located in a second region of the compound light-guide arrangement at least partially non-overlapping with the first region for coupling-out a second part of the field of view of the image illumination for viewing by the eye of the user, and wherein optical coupling of the image projector to the compound light-guide arrangement and deployment of the first and second pluralities of partially-reflecting surfaces are such that first and second rays of image illumination emerging parallel from the image projector and coupled respectively into the first and second light-guide optical elements propagate at different angles within the first and second light-guide optical elements but are coupled out respectively by the first and second pluralities of partially-reflecting surfaces as parallel rays. According to a further feature of an embodiment of the present invention, the image projector injects the image illumination into the compound light-guide arrangement via one of the major surfaces, and wherein the first part of the image illumination is coupled into the first light-guide optical element by a first reflector and the second part of the image illumination is coupled into the second light-guide optical element by a second reflector. According to a further feature of an embodiment of the present invention, the first reflector and the second reflector are non-parallel.

According to a further feature of an embodiment of the present invention, the first reflector and the second reflector are full reflectors in non-overlapping relation.

According to a further feature of an embodiment of the present invention, the second reflector is a partial reflector, and wherein light reaches the first reflector after passing through the second reflector.

According to a further feature of an embodiment of the present invention, the second reflector is internal to the second light-guide optical element, and wherein the first reflector is associated with a surface of a prism attached to the major surface of the first light-guide optical element that is further from the image projector.

According to a further feature of an embodiment of the present invention, there is also provided an adjustment mechanism for allowing fine adjustment of an angle of the first reflector.

According to a further feature of an embodiment of the present invention, the first light-guide optical element and the second light-guide optical element are separated by an air gap.

According to a further feature of an embodiment of the present invention, the transparent material of the first and second light-guide optical elements has a first refractive index, and wherein the first light-guide optical element and the second light-guide optical element are separated by a layer of material having a second refractive index lower than the first refractive index.

According to a further feature of an embodiment of the present invention, each of the juxtaposed major surfaces is provided with an anti-reflective coating.

According to a further feature of an embodiment of the present invention, at least one of the juxtaposed major surfaces of the first light-guide optical element and the second light-guide optical element is provided with an angularly-selective multi-layer dielectric coating configured to be fully reflective for angles of incidence greater than 60 degrees to a normal to the major surfaces and to have low reflectivity for angles of incidence smaller than 15 degrees to the normal.

According to a further feature of an embodiment of the present invention, the first light-guide optical element includes a first set of mutually-parallel, partially-reflecting deflecting surfaces deployed between the major surfaces of the first light-guide optical element, the first set of deflecting surfaces being deployed to progressively deflect the first part of the image illumination propagating within the first light-guide optical element towards the first plurality of partially-reflecting surfaces, and wherein the second light-guide optical element includes a second set of mutually-parallel, partially-reflecting deflecting surfaces deployed between the major surfaces of the second light-guide optical element, the second set of deflecting surfaces being deployed to progressively deflect the second part of the image illumination propagating within the second light-guide optical element towards the second plurality of partially-reflecting surfaces.

According to a further feature of an embodiment of the present invention, lines of intersection of planes of the first set of deflecting surfaces with the major surfaces are non-parallel with lines of intersection of planes of the second set of deflecting surfaces with the major surfaces.

According to a further feature of an embodiment of the present invention, the first light-guide optical element includes a first internal reflective surface, parallel to the first set of deflecting surfaces and deployed to deflect the first part of the image illumination propagating within the first light-guide optical element towards the first set of deflecting surfaces, and wherein the second light-guide optical element includes a second internal reflective surface, parallel to the second set of deflecting surfaces and deployed to deflect the second part of the image illumination propagating within the second light-guide optical element towards the second set of deflecting surfaces.

BRIEF DESCRIPTION OF THE DRAWINGS

The invention is herein described, by way of example only, with reference to the accompanying drawings, wherein:

FIGS. 5A-5C are front views of a second LOE, a first LOE and a stack assembled from the first and second LOEs, respectively, according to a further embodiment of the display of the present invention for providing aperture expansion in two dimensions; and FIGS. 6A-6C are side views corresponding to FIGS. 5A-5C, respectively.

DESCRIPTION OF THE PREFERRED EMBODIMENTS

Figure 1:
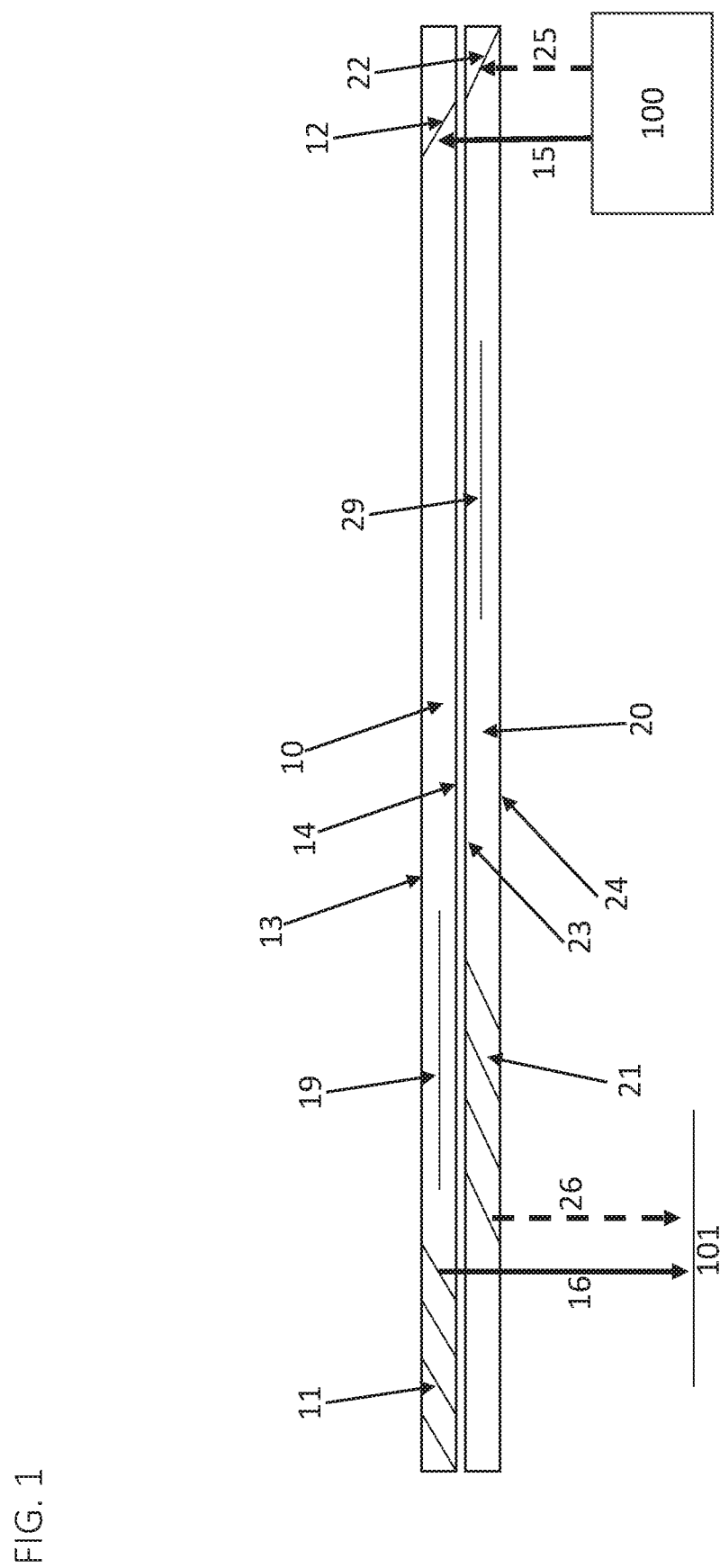
FIG. 1 is a schematic side view of a display, constructed and operative according to the teachings of an embodiment of the present invention, employing a stack of light-guide optical elements (LOEs) to convey an image from a projector to the eye of a user, where each LOE conveys a different part of the field of view.

The present invention is a display for providing an image to an eye of a user.

The principles and operation of displays according to the present invention may be better understood with reference to the drawings and the accompanying description.

Referring now to the drawings, FIGS. 1-5 all show implementations of a display, constructed and operative according to the teachings of the present invention, for providing an image to an eye of a user, where the eye is assumed to be located at a region designated 101, referred to as the "eye motion box" (EMB), which denotes the range of eye positions for which the display is designed to provide a full image. Generally speaking, the display includes a compound light-guide arrangement having first and second light-guide optical elements ("LOEs", referred to interchangeably as "waveguides") 10 and 20, each formed as a block of transparent material having a pair of mutually-parallel major surfaces (13 and 14 for LOE 10, and 23 and 24 for LOE 20).

The two LOEs 10 and 20 are stacked with major surfaces 14 and 23 juxtaposed in such a manner that they retain their properties as separate waveguides, guiding propagation of light within each LOE by internal reflection at the major surfaces. This may be done by maintaining an air gap between the juxtaposed surfaces, by providing an intervening layer of material with lower refractive index, either as a distinct sheet of material or a layer of low-index adhesive, or by providing a coating on one or both of the juxtaposed surfaces which mimics TIR properties, typically in the form of a multi-layer dielectric coating. The terms "juxtaposed" or "adjacent" are used to encompass all of the above options, whether the major surfaces are in non-contact proximity separated by an air space, separated by an intervening layer of material, or in direct contact. In all cases, a relatively high transmissivity is preferably maintained for light passing through the compound light-guide arrangement at angles relatively close to perpendicular, typically by applying anti-reflective coatings, so as to allow viewing of an outside scene through the display.

An image projector 100, configured to project image illumination corresponding to a collimated image with an angular field of view, is optically coupled to the compound light-guide arrangement so as to introduce a first part of the image illumination to propagate by internal reflection within the first LOE 10 and a second part of the image illumination to propagate by internal reflection within the second LOE 20. Various implementations of coupling-in arrangements for optically coupling the image projector 100 to the compound light-guide arrangement will be discussed below.

The first LOE 10 includes a first coupling-out configuration having a first plurality of mutually-parallel, partially-reflecting surfaces 11 deployed between, and angled obliquely to, the major surfaces 13 and 14. The first plurality of partially-reflecting surfaces 11 are located in a first region of the compound light-guide arrangement for coupling-out a first part of the field of view of the image illumination for viewing by the eye of the user.

The second LOE 20 includes a second coupling-out configuration having a second plurality of mutually-parallel, partially-reflecting surfaces 21 deployed between, and angled obliquely to, the major surfaces 23 and 24. The second plurality of partially-reflecting surfaces 21 are non-parallel to the first plurality of partially-reflecting surfaces 11 and are located in a second region of the compound light-guide arrangement at least partially non-overlapping with the first region for coupling-out a second part of the field of view of the image illumination for viewing by the eye of the user.

The optical coupling of image projector 100 to the compound light-guide arrangement and deployment of the first and second pluralities of partially-reflecting surfaces 11 and 21 are such that first and second rays of image illumination 15 and 25 emerging parallel from the image projector 100 and coupled respectively into the first and second light-guide optical elements 10 and 20 propagate at different angles within the first and second light-guide optical elements but are coupled out respectively by the first and second pluralities of partially-reflecting surfaces 11 and 21 as parallel rays 16 and 26, respectively.

At this point, it will already be appreciated that the present invention provides a number of significant advantages. Specifically, since each waveguide is required to convey only a subregion of the angular field of view, the design requirements for angularly-selective coatings employed in the partially-reflecting surfaces of the coupling-out configurations, and various other components, are relaxed. Specifically, each coupling-out surface is preferably partially reflective for the red, green and blue light at a range of angles corresponding to the desired image, while being highly transparent (anti-reflective) for red, green and blue at a range of angles corresponding to the conjugate image. If these properties are only required for a part of the field of view of the image, the design requirements are considerably relaxed. Additionally, or alternatively, the display can be implemented to convey a field of view which is greater than could be conveyed by a single waveguide due to angular limitations of TIR and/or ghosts formed by crossing part of the image crossing the center plane of the waveguide and being folded on itself, and/or being reflected by an internal surface so as to reflect part of the image to overlap another part (i.e., when part of the image part of the convey propagates parallel to one the partially-reflecting coupling-out surfaces). In each waveguide, the part of the FOV which is not required to be delivered by that waveguide can be allowed to exceed these angular limitations, either being allowed to escape from TIR or with part of the image being folded on its conjugate, without impacting the quality of the image visible at the eye-motion box. At the same time, the fact that all parts of the image originate from a single image projector keeps costs of manufacture low, and simplifies the task of maintaining aligning between the different parts of the displayed image. These and other advantages of the present invention will become clearer from the examples detailed below.

Turning now to FIG. 1, this illustrates an implementation of the display described above, with two LOEs 10 and 20, each formed as a slab structure of transparent material such as glass, or other material with a sufficient refractive index to support waveguide propagation. As mentioned, each LOE has two major parallel surfaces 13 & 14 (23 & 24 for the second LOE 20), a set of inner parallel surfaces 11 (21 for the second LOE) with partial reflectance coating in an oblique angle to the major surfaces. The LOE optionally also includes an internal surface 19, 29 parallel to the major surfaces with partial reflection to homogenize the output intensity distribution. A particularly preferred implementation of this internal surface is a surface at the mid-plane of the waveguide with roughly 50% reflectivity for the range of angles corresponding to image illumination propagating within the waveguide, and low reflectivity (anti-reflective) at viewing angles nearer to perpendicular through the waveguide.

The image projector 100 (referred to interchangeably as a "POD") employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions. Image projector 100 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using one or more fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

In the particularly preferred implementations illustrated here, image projector 100 injects image illumination into the compound light-guide arrangement via one of the major surfaces 24. In this case, a first part of the image illumination is coupled into the first light-guide optical element 10 by a first reflector 12, and a second part of the image illumination is coupled into the second light-guide optical element 20 by a second reflector 22. Though surfaces 11 and 21 are not parallel and coupling-in reflectors 12 and 22 are not parallel, if the absolute angle between these surfaces and the major surfaces of the LOE are equal (i.e., absolute angle between surfaces 12 and 14 and surfaces 11 and 14 are equal, and so are angles between surfaces 22 and 24, and between surfaces 21 and 24) parallel rays 15 & 25 entering both LOEs will exit the LOEs from the inner surface array also parallel (rays 16 & 26). That will happen although the FOV guided by each LOE will differ due to the different angles of slanted inner surfaces.

Figure 2:
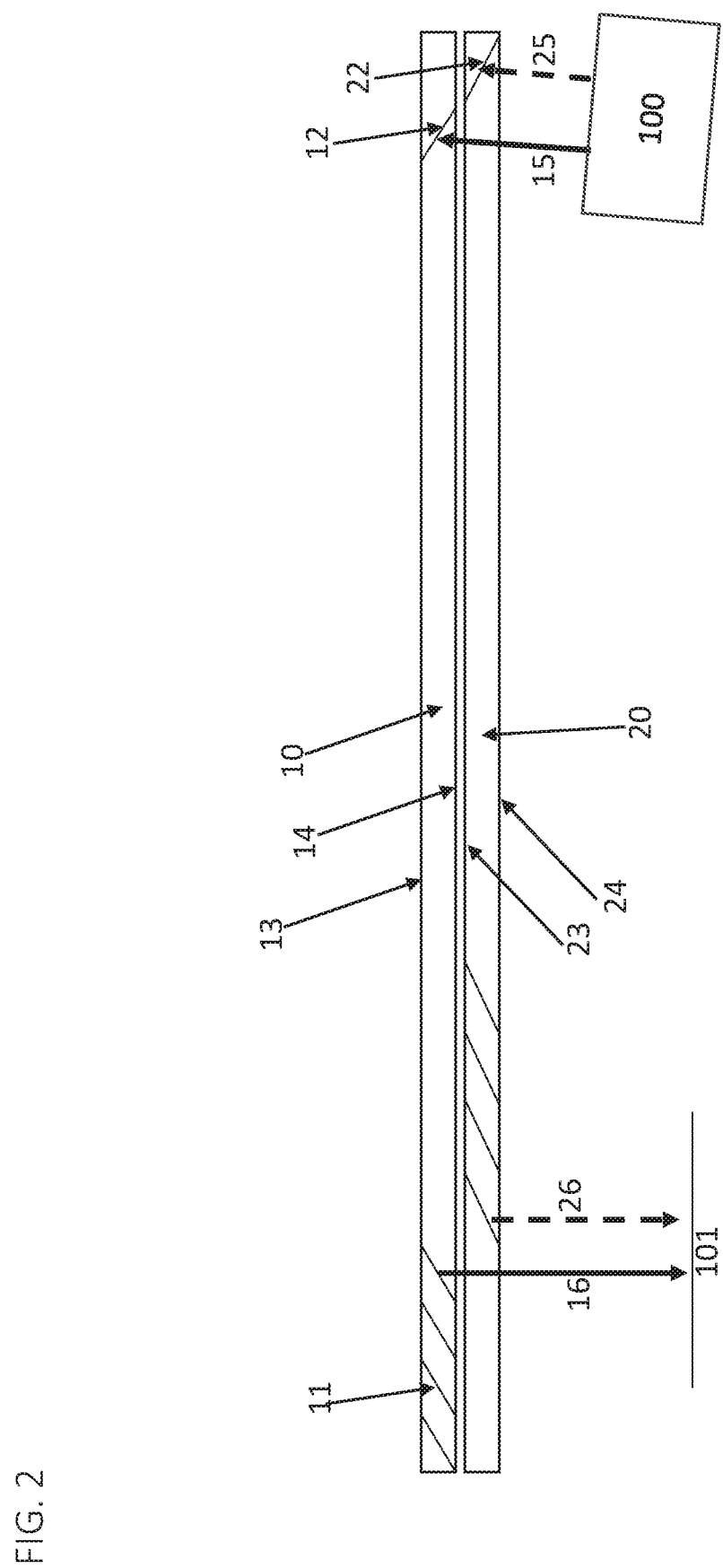
FIG. 2 is a view similar to FIG. 1 illustrating an implementation in which coupled-in rays are non-parallel to coupled-out rays, while parallel image rays of the projected image remain parallel in the coupled-out image.

Furthermore, as shown in FIG. 2, even if input coupling surface and output coupling surface array are not parallel or at the same absolute angle to the major surfaces, so long as the angular difference is the same for both LOEs, then parallel rays 15 & 25 entering both LOEs will exit the LOEs from the inner partially-reflecting surface array also parallel (rays 16 & 26), albeit with a different angle than they entered (i.e., rays 15 and 16 are not parallel in this figure).

In the exemplary implementations of FIGS. 1 and 2, first reflector 12 and second reflector 22 are full reflectors in non-overlapping relation. In this case, the input aperture width of the two LOEs roughly equals the summation of each input aperture.

Figure 3:
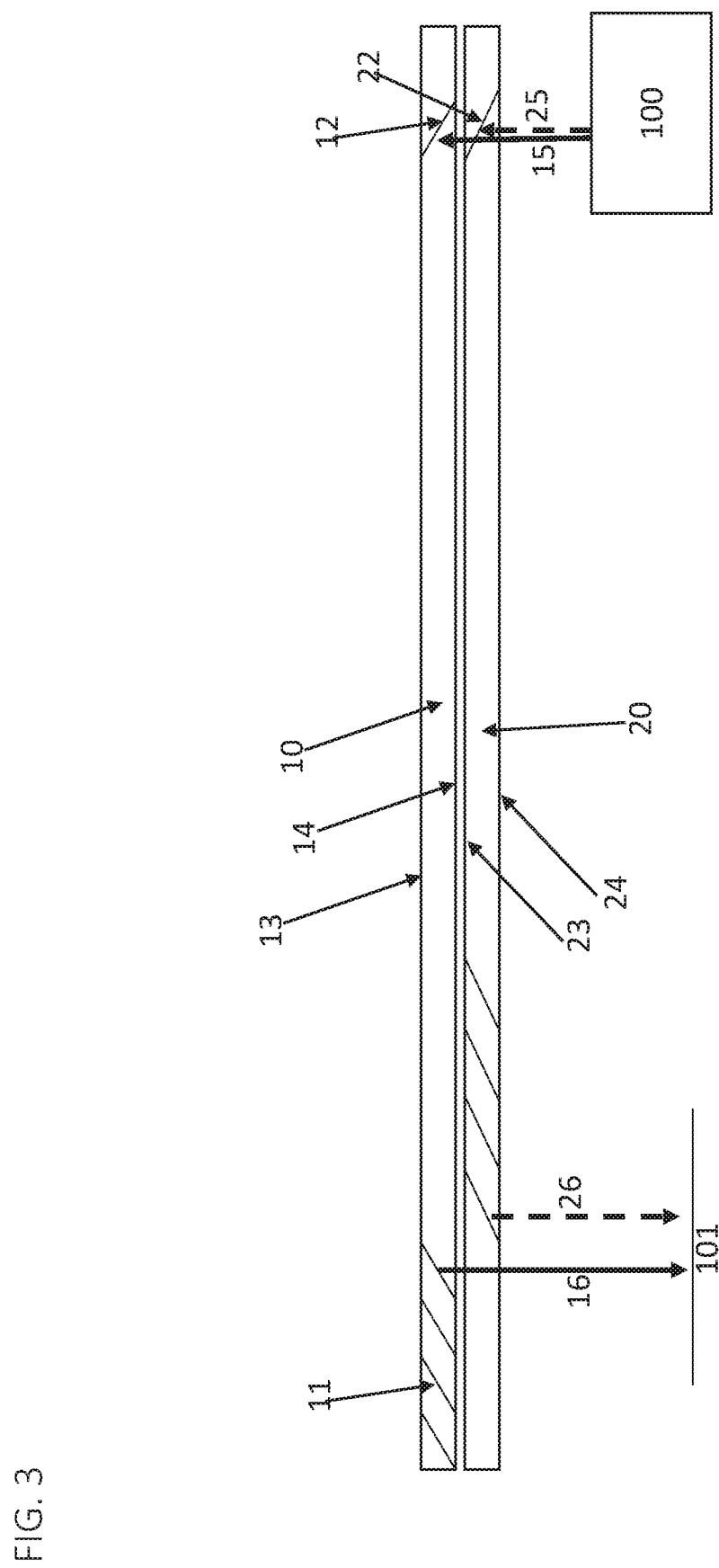
FIG. 3 is a view similar to FIG. 1 illustrating a reduced dimension coupling-in aperture achieved by using an overlapping partially-reflecting coupling-in reflector.

In an alternative set of implementations exemplified by FIG. 3, the second reflector 22 is a partial reflector, and light reaches the first reflector 12 after passing through the second reflector 22. In the case of FIG. 3, reflectors 12 and 22 are internal reflectors integrated within the LOEs, i.e., between the planes of the corresponding major surfaces. Spatial overlap of the input apertures reduces the overall input aperture width. For this implementation, the coupling-in surface reflectivity should be set to 50% for the LOE closer to the image projector. Thus in FIG. 3, surfaces 12 and 22 overlap, and surface 22 should have a reflectivity of approximately 50%.

Figure 4A:
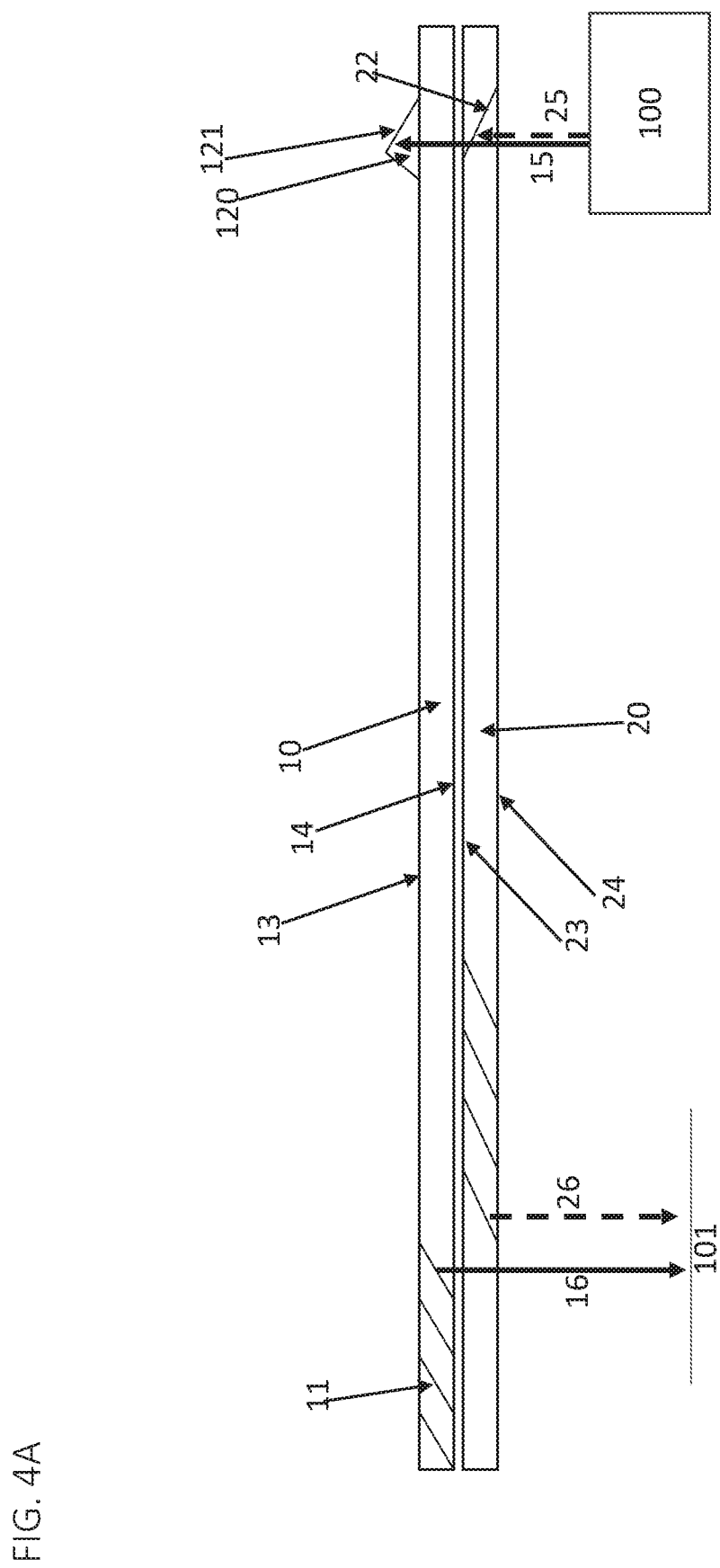
FIG. 4A is a view similar to FIG. 3 illustrating an implementation of a coupling-in reflector on an external prism on one LOE.
Figure 4B:
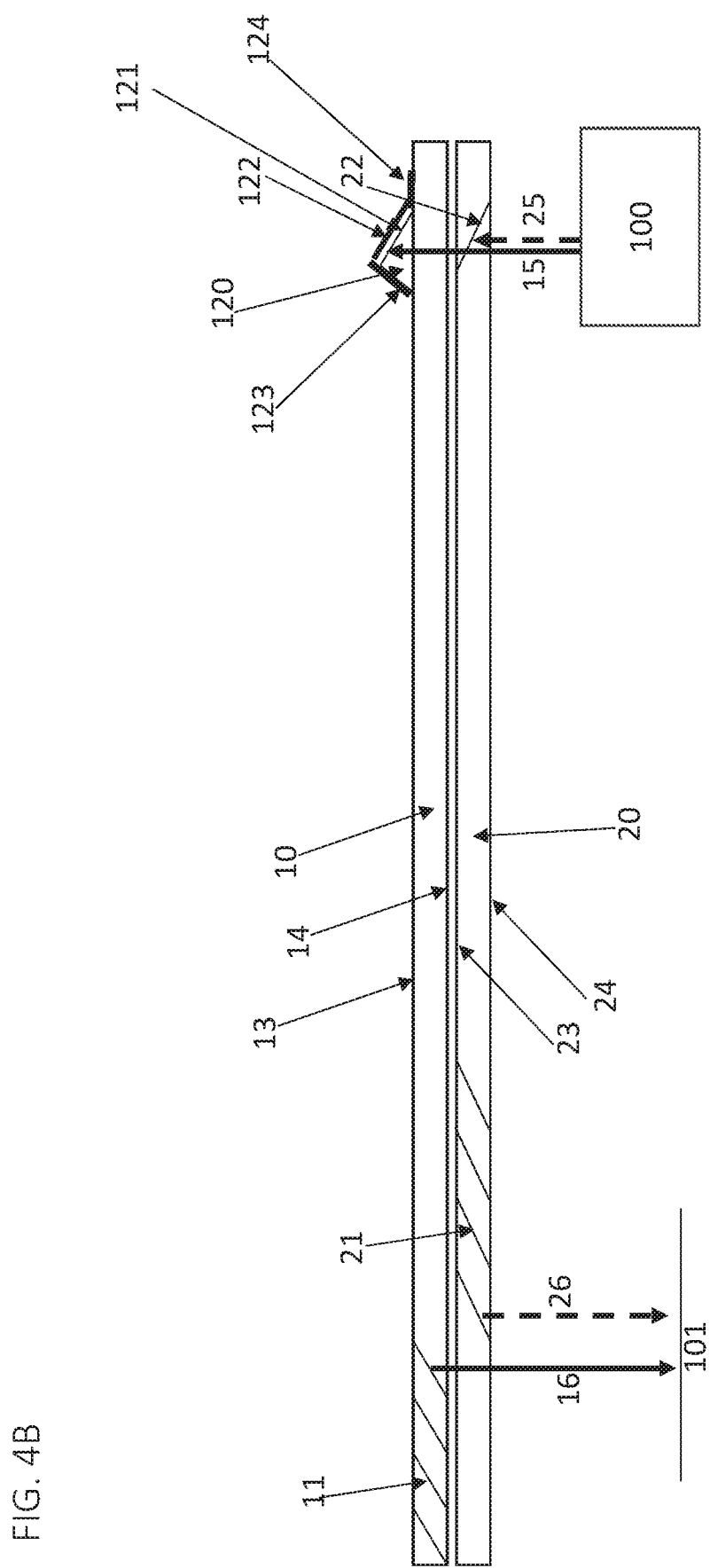
FIG. 4B is a view similar to FIG. 4A where the external prism is used together with an external reflector surface.
Figure 4C:
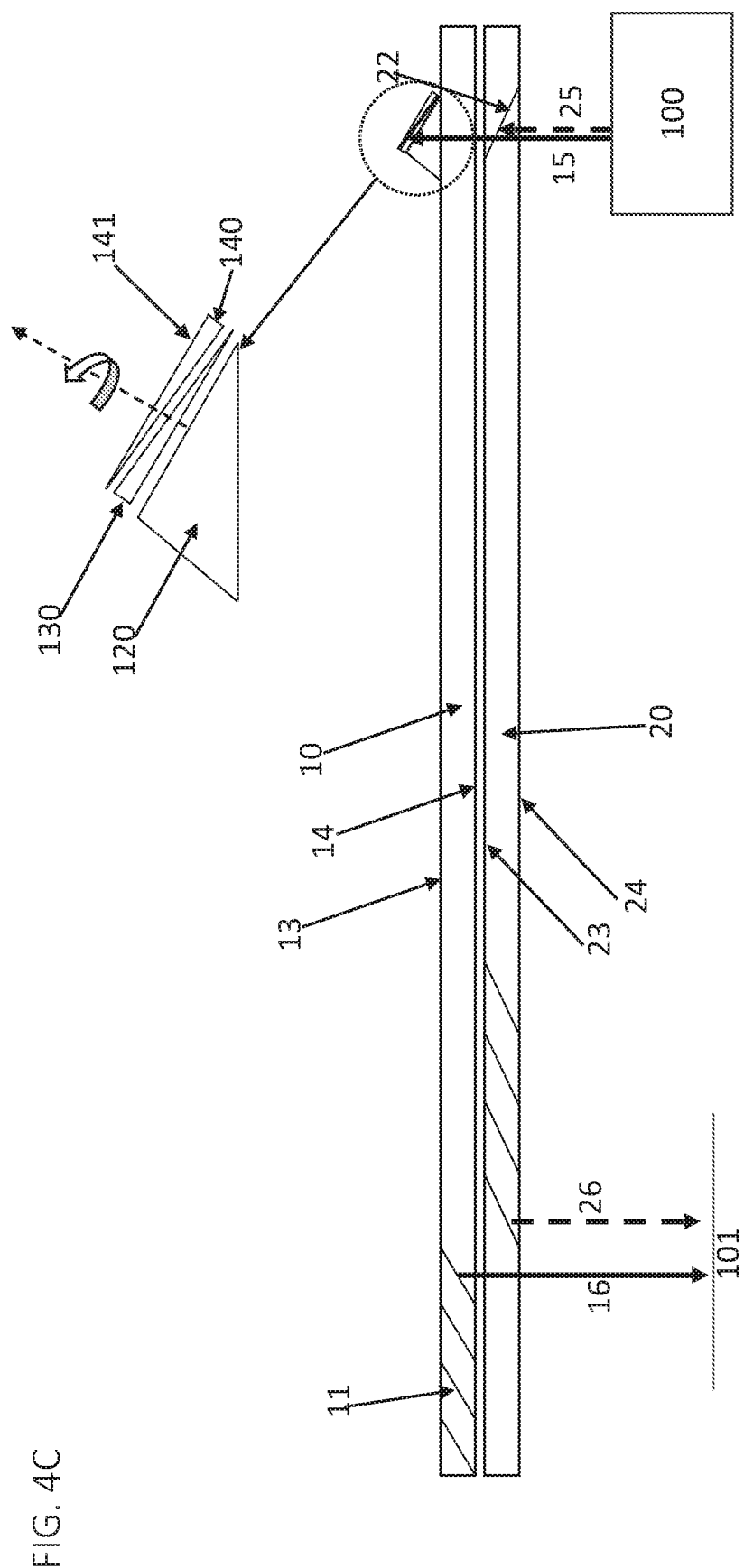
FIG. 4C is a view similar to FIG. 4B where the external reflector surface is rendered adjustable by use of a Risley wedge-prism pair.

In a variant set of implementations illustrated in FIGS. 4A-4C, second reflector 22 is internal to the second LOE 20, while first reflector is associated, directly or indirectly, with a surface of a prism 120 attached to the major surface 13 of the first LOE 120 that is further from the image projector 100.

Specifically, in the case of FIG. 4A, prism 120 is glued to LOE 10 and light is reflected and coupled into the LOE by surface 121 of prism 120.

In a further option illustrated in FIG. 4B, instead of a reflective surface formed on the prism directly, prism 120 may cooperate with an external reflector surface 122 serving as the "first reflector", so that light exits from prism 120, is reflected from external surface 122 and reenters prism 120 so as to be guided inside the LOE, as shown in FIG. 4B, where the ray 15 is reflected into LOE 10 by external surface 122 via prism 120. In this case, surface 121 may be provided with an AR (anti-reflection) coating. Optionally, positioning of external reflector surface 122 may be fixed by adhesive attachment of some associated surfaces, like surfaces 123 and 124, to LOE 10 and/or prism 120 on areas that are not optically active (i.e., that the light reaching the EMB from the image projector does not hit these surfaces as it propagates).

In certain particularly preferred implementations, the display of the present invention may be provided with an adjustment mechanism for allowing fine adjustment of an angle of the first reflector. Thus, in the implementation of FIG. 4B, an active alignment system and process may be used to ensure the parallelism of rays exiting both LOEs. In such an alignment procedure, a single collimated beam of light is coupled into both LOEs. The beam is also measured at the output, as coupled-out from the LOEs by the arrays of partially-reflecting internal surfaces 11 and 21. If the angle difference between 21 and 22 is not equal to the angle difference between 11 and 12, then the rays leaving LOE 10 will not be parallel to that of LOE 20. If an external mirror is used as in FIG. 4B, then the pitch and yaw of the mirror can be tilted using a suitable adjustment mechanism until parallelism between rays 16 and 26 is reached, and the position is then fixed by gluing surfaces 123 and 124 to preserve the orientation of reflector 122.

Furthermore, even in the case of a prism 120 with an integrated reflecting surface 121 as shown in FIG. 4A, a similar active alignment process can be implemented by providing a set of interchangeable prisms with small differences in angles that can be temporarily glued to LOE 10, and the prism with closest angular difference between rays 16 and 26 is selected to be permanently glued to LOE 10.

An alternative mechanism and corresponding method for adjusting the orientation of the first reflector input coupling surface of LOE 10 is illustrated in FIG. 4C. In this case, on top on prism 120, two wedged windows 130 and 140 are glued. These two wedged windows serve as a Risley prism pair. Typical wedge values would be of 1 degree and denoted as a. In the drawing, the angle is exaggerated for clarity of explanation. If the two wedge windows have their wedges oriented opposite one to the other as shown, a reflective outer surface 141 is parallel to the outer surface of prism 120. By rotating window 140 relative to window 130, the angle between the surface of prism 120 and reflective surface 141 can be varied up to 2α. Thus, by continuous rotation of prism 140, any polar angle in this range could be obtained. By rotating window 130 (together with window 140) relative to the surface of prism 120, azimuthal adjustment can be obtained. Thus, any desired orientation of first reflector surface 141 can be obtained by suitable rotation of the two wedge windows, thereby facilitating an active alignment process as described above. The two wedge windows are then secured in their optimal positions by any suitable form of attachment, typically by use of optical adhesive. All intermediate surfaces are preferably provided with AR coatings in order to minimize unwanted reflections which might lead to ghost images.

Turning now to FIGS. 5A-6C, although the invention has thus far been illustrated in the context of a device which performs expansion of an optical aperture of the image projector in one dimension, the invention can also be implemented to advantage in the context of LOEs which perform aperture expansion in two dimensions. For such an implementation, the first light-guide optical element 10 preferably includes a first set of mutually-parallel, partially-reflecting deflecting surfaces 17 deployed between the major surfaces 13, 14 of the first light-guide optical element 10. The first set of deflecting surfaces 17 are deployed to progressively deflect the image illumination propagating within the first light-guide optical element towards the first plurality of partially-reflecting surfaces 11. Similarly, the second light-guide optical element 20 includes a second set of mutually-parallel, partially-reflecting deflecting surfaces 27 deployed between the major surfaces 23, 24 of the second light-guide optical element 20. The second set of deflecting surfaces 27 are deployed to progressively deflect the part of the image illumination propagating within the second light-guide optical element towards the second plurality of partially-reflecting surfaces 21. In the particularly preferred but non-limiting exemplary implementation of FIGS. 5A-6C, first LOE 10 includes a first internal reflective surface 18, parallel to the first set of deflecting surfaces 17, and deployed to deflect the part of the image illumination propagating within the first light-guide optical element towards the first set of deflecting surfaces. Similarly, second LOE 20 includes a second internal reflective surface 28, parallel to the second set of deflecting surfaces 27 and deployed to deflect the part of the image illumination propagating within the second light-guide optical element towards the second set of deflecting surfaces.

For simplicity of presentation, FIGS. 5A and 6A show front and side views, respectively, of the second LOE 20, FIGS. 5B and 6B show similar views of the first LOE 10, and FIGS. 5C and 6C show corresponding views of the assembled display. The features of second LOE 20 are shown in dashed lines in order to facilitate differentiation of the features when stacked.

Thus, in addition to the aperture expansion of the LOE in the X-direction achieved by the structures of FIGS. 1-4C, this embodiment achieves and additional dimension of aperture expansion along the Y-direction. Deflecting surfaces 17 and 27 are partially reflective surfaces, while internal reflective surfaces 18 and 28 are parallel to their respective deflecting surfaces, but are preferably full reflectors. The light coupled in from the image projector 100 by surface 22 to be guided by the second LOE 20 is reflected by surface 28 so as to be deflected towards deflecting surfaces 27, where it is progressive deflected and reflected by surfaces 27. Since surfaces 27 and 28 are all parallel, the finally deflected rays from surfaces of array 27 will be parallel to the light coupled into the LOE by surface 22. The same applies also to rays being deflected by surfaces 18 and 17 inside LOE 10. Thus, although surfaces 27 and 17 may not be parallel, parallel rays of light coupled into first LOE 10 and into second LOE 20, may still emerge parallel.

In certain implementations, lines of intersection of planes of the first set of deflecting surfaces 17 with the major surfaces 13, 14 are non-parallel with lines of intersection of planes of the second set of deflecting surfaces 27 with the major surfaces.

In certain implementations, first set of deflecting surfaces 17 and/or the second set of deflecting surfaces 27 are orthogonal to the major surfaces of the LOEs. In this case, both the direct image and its conjugate are deflected by these surfaces and are redirected towards the outcoupling region. In alternative implementations, first set of deflecting surfaces 17 and/or the second set of deflecting surfaces 27 are oblique to the major surfaces of the LOE. In this case, only one image (either the primary image or its conjugate) are progressively deflected towards the coupling-out region, while the surfaces are preferably made substantially transparent in the range of angles of incidence corresponding to the unwanted image.

Implementation Details—Coatings

For optimal implementation of the various embodiments described herein, the various surfaces and interfaces between elements are most preferably imparted with angularly-selective properties. These properties can be generated conveniently using well established technology for designing and implementing multi-layer dielectric coatings in which a sequence of layers of specific thicknesses provide the desired properties.

Regarding the juxtaposed surfaces of the two LOEs, as already mentioned, this is performed so as to retain their properties as separate waveguides, guiding propagation of light within each LOE by internal reflection at the major surfaces. This may be done by maintaining an air gap between the juxtaposed surfaces, or by providing an intervening layer of material with lower refractive index, either as a distinct sheet of material or a layer of low-index adhesive. Alternatively, functional separation of the LOEs can be ensured by providing a coating on one or both of the juxtaposed surfaces which mimics TIR properties, typically in the form of a multi-layer dielectric coating. Thus, at least one of the juxtaposed major surfaces, and most preferably both, are provided with an angularly-selective multi-layer dielectric coating configured to be fully reflective (e.g., over 95% reflective) for angles of incidence greater than 60, more preferably over 50, and in some cases, from about 40 degrees and upwards, relative to a normal to the major surfaces, while having low reflectivity, preferably less than 5%, for angles of incidence smaller than 15 degrees, and more preferably up to about 30 degrees, to the normal.

In each case, visibility for a user looking through the compound waveguide at relatively low angles to a normal to the major surfaces is preferably maintained highly transparent by including antireflecting coatings on all surfaces and interfaces.

Similarly, homogenizing surfaces 19 and 29, where used, preferably have the desired (typically roughly 50%) reflectance within the range of angles at which the image illumination propagates within the LOEs, while being antireflective at small (near perpendicular) angles.

The coupling-out partially-reflecting surfaces are also preferably partially-reflecting at angles of incidence corresponding to the desired part of the image, while being antireflecting for the conjugate image. The proportion of reflectance of the desired image may also sequentially increase between successive surfaces.

All of the above properties are most preferably substantially uniform for different colors, allowing display of the relevant part of the field of view of a color image via each LOE.

It will be appreciated that the above descriptions are intended only to serve as examples, and that many other embodiments are possible within the scope of the present invention as defined in the appended claims.

What is claimed is:

1. A display for providing an image to an eye of a user, the display comprising:
   (a) a compound light-guide arrangement comprising:
      (i) a first light-guide optical element comprising a block of transparent material having a pair of mutually-parallel major surfaces for guiding light by internal reflection at said major surfaces, and
      (ii) a second light-guide optical element comprising a block of transparent material having a pair of mutually-parallel major surfaces for guiding light by internal reflection at said major surfaces, said first and second light-guide optical elements being stacked with said major surfaces juxtaposed; and
   (b) an image projector configured to project image illumination corresponding to a collimated image with an angular field of view, said image projector being optically coupled to said compound light-guide arrangement so as to introduce a first part of the image illumination to propagate by internal reflection within the first light-guide optical element and a second part of the image illumination to propagate by internal reflection within the second light-guide optical element, wherein said first light-guide optical element includes a first coupling-out configuration comprising a first plurality of mutually-parallel, partially-reflecting surfaces deployed between said major surfaces of said first light-guide optical element and angled obliquely to said major surfaces, said first plurality of partially-reflecting surfaces being located in a first region of said compound light-guide arrangement for coupling-out a first part of the field of view of the image illumination for viewing by the eye of the user, and wherein said second light-guide optical element includes a second coupling-out configuration comprising a second plurality of mutually-parallel, partially-reflecting surfaces deployed between said major surfaces of said second light-guide optical element and angled obliquely to said major surfaces, said second plurality of partially-reflecting surfaces being non-parallel to said first plurality of partially-reflecting surfaces and located in a second region of said compound light-guide arrangement at least partially non-overlapping with said first region for coupling-out a second part of the field of view of the image illumination for viewing by the eye of the user, and wherein optical coupling of said image projector to said compound light-guide arrangement and deployment of said first and second pluralities of partially-reflecting surfaces are such that first and second rays of image illumination emerging parallel from said image projector and coupled respectively into said first and second light-guide optical elements propagate at different angles within said first and second light-guide optical elements but are coupled out respectively by said first and second pluralities of partially-reflecting surfaces as parallel rays.

2. The display of claim 1, wherein said image projector injects said image illumination into said compound light-guide arrangement via one of said major surfaces, and wherein the first part of the image illumination is coupled into said first light-guide optical element by a first reflector and the second part of the image illumination is coupled into said second light-guide optical element by a second reflector.

3. The display of claim 2, wherein said first reflector and said second reflector are non-parallel.

4. The display of claim 2, wherein said first reflector and said second reflector are full reflectors in non-overlapping relation.

5. The display of claim 2, wherein said second reflector is a partial reflector, and wherein light reaches said first reflector after passing through said second reflector.

6. The display of claim 2, wherein said second reflector is internal to said second light-guide optical element, and wherein said first reflector is associated with a surface of a prism attached to the major surface of the first light-guide optical element that is further from said image projector.

7. The display of claim 6, further comprising an adjustment mechanism for allowing fine adjustment of an angle of said first reflector.

8. The display of claim 1, wherein said first light-guide optical element and said second light-guide optical element are separated by an air gap.

9. The display of claim 8, wherein each of said juxtaposed major surfaces is provided with an anti-reflective coating.

10. The display of claim 1, wherein the transparent material of said first and second light-guide optical elements has a first refractive index, and wherein said first light-guide optical element and said second light-guide optical element are separated by a layer of material having a second refractive index lower than said first refractive index.

11. The display of claim 10, wherein each of said juxtaposed major surfaces is provided with an anti-reflective coating.

12. The display of claim 1, wherein at least one of the juxtaposed major surfaces of said first light-guide optical element and said second light-guide optical element is provided with an angularly-selective multi-layer dielectric coating configured to be fully reflective for angles of incidence greater than 60 degrees to a normal to the major surfaces and to have low reflectivity for angles of incidence smaller than 15 degrees to the normal.

13. The display of claim 1, wherein said first light-guide optical element includes a first set of mutually-parallel, partially-reflecting deflecting surfaces deployed between said major surfaces of said first light-guide optical element, said first set of deflecting surfaces being deployed to progressively deflect the first part of the image illumination propagating within said first light-guide optical element towards said first plurality of partially-reflecting surfaces, and wherein said second light-guide optical element includes a second set of mutually-parallel, partially-reflecting deflecting surfaces deployed between said major surfaces of said second light-guide optical element, said second set of deflecting surfaces being deployed to progressively deflect the second part of the image illumination propagating within said second light-guide optical element towards said second plurality of partially-reflecting surfaces.

14. The display of claim 13, wherein lines of intersection of planes of said first set of deflecting surfaces with said major surfaces are non-parallel with lines of intersection of planes of said second set of deflecting surfaces with said major surfaces.

15. The display of claim 13, wherein said first light-guide optical element includes a first internal reflective surface, parallel to said first set of deflecting surfaces and deployed to deflect the first part of the image illumination propagating within said first light-guide optical element towards said first set of deflecting surfaces, and wherein said second light-guide optical element includes a second internal reflective surface, parallel to said second set of deflecting surfaces and deployed to deflect the second part of the image illumination propagating within said second light-guide optical element towards said second set of deflecting surfaces.

\* \* \* \* \*